United States Patent [19]

Hill

[11] 4,123,193
[45] Oct. 31, 1978

[54] DOUBLE ENDED DRILL STOP
[75] Inventor: Horace E. Hill, Renton, Wash.
[73] Assignee: The Boeing Company, Seattle, Wash.
[21] Appl. No.: 751,566
[22] Filed: Dec. 17, 1976
[51] Int. Cl.² ............................................. B23B 47/00
[52] U.S. Cl. ................................. 408/202; 408/241 S
[58] Field of Search ............... 408/202, 224, 226, 230, 408/186, 191, 192, 241 S

[56] References Cited

U.S. PATENT DOCUMENTS 1,267,704  5/1918  Skrukrud ............................ 408/191

FOREIGN PATENT DOCUMENTS 1,091,124  4/1955  France ..................................... 408/226
136,361  7/1952  Sweden ................................... 408/226

Primary Examiner—Leonidas Vlachos
Attorney, Agent, or Firm—Conrad O. Gardner; B. A. Donahue

[57] ABSTRACT

A drill stop having a dimple arranged so that the drill stop can be utilized after the drill has been ground to a shorter length. A cylindrically shaped tubular member is provided with a dimple off center with respect to the longitudinal axis which dimple provides an interference fit in the drill flute along the run out ramp portion of the flute adjacent the shank end of the drill. A further dimple opposite the first dimple may be utilized to reinforce the function of the first dimple.

4 Claims, 7 Drawing Figures

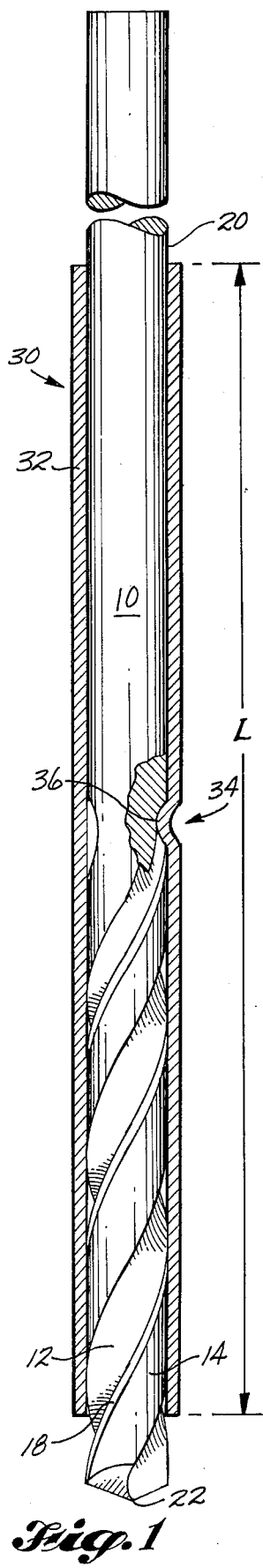
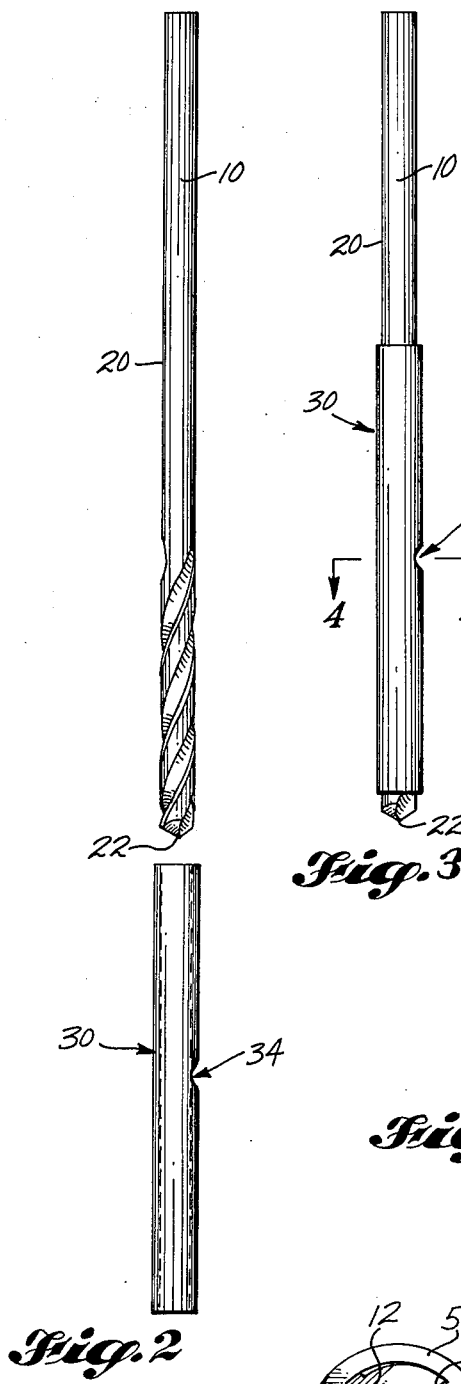
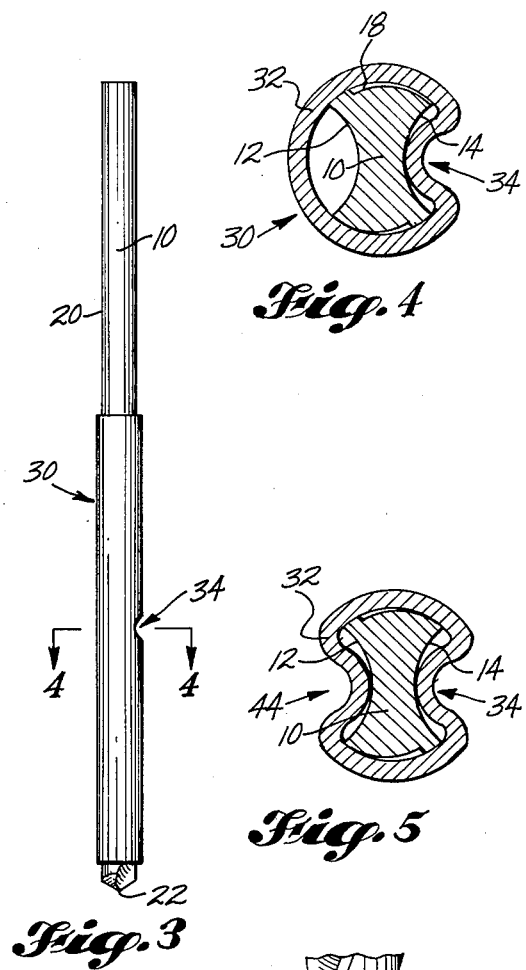
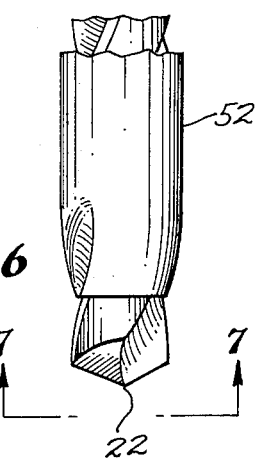
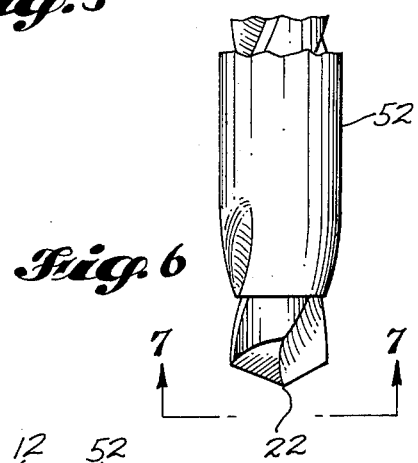
Fig. 1
Fig. 2
Fig. 3
Fig. 4
Fig. 5
Fig. 6
Fig. 7
U.S. Patent    Oct. 31, 1978    4,123,193

DOUBLE ENDED DRILL STOP

This invention relates to drill stops and more particularly to sleeve type drill stops.

Various types of sleeve like members have been utilized for preventing damage to drills, controlling the depth of a drilled hole, and/or for the prevention of drill damage to members to the rear of the workpiece as exemplified by U.S. Pat. Nos. 2,163,252; 2,317,615; 2,353,514; 2,361,683; 2,700,905; and, French Pat. No. 1,066,395. Generally these approaches utilize cumbersome hardware for attachment to a drill and, as those utilized by industry, e.g. where a set-screw is utilized with inherent disadvantages thereof, take time for operator attachment.

Where currently available types are utilized e.g. the type having a collar with a set-screw for attaching to drill and a coil spring with a nose button to provide the stopping surface, if the set-screw is long enough to reach the bottom of the drill flutes, it protrudes from the collar when not in the flutes and can cause injuries. Besides potential safety problems other disadvantages inherent therein dictate against its use or acceptability by the drill operator viz. the excessive man hours required to change the drill stop from one drill to another or in changing position on a drill as its length is consumed since a wrench is required in the process.

Accordingly it is an object of this invention to provide drill stop means having an automatic lock on feature.

It is yet another object of this invention to provide drill stop means which is reversible for utilization upon decrease in length of the drill.

It is a further object of this invention to provide drill stop means utilizing a dimpled structure for providing an interference fit with a portion of the flute of a drill for locating and positioning the drill stop on the drill.

Other objects and advantages of the invention will be more fully understood from a consideration of the following specification, taken in conjunction with the accompanying drawing; and in which:

FIG. 1 is a side elevational view in section illustrative of a drill stop in accordance with the invention showing dimple bottoming out on the flute run out ramp of the drill;

FIG. 2 is a side view of drill FIG. 1 prior to insertion with clearance fit into the drill stop of FIG. 1;

FIG. 3 is a side view of drill and drill stop of FIGS. 1 and 2 assembled for use by the operator;

FIG. 4 is a vertical sectional view, taken substantially on the line 4 — 4 of FIG. 3 showing dimple bottomed out in drill flute;

FIG. 5 vertical sectional view of a further embodiment of drill and drill stop assembly which includes a further dimple opposite the one shown in the structure of FIG. 4;

FIG. 6 is a side elevational view of a further embodiment of drill end portion of drill stop shown in FIG. 1 illustrative of means for preventing chip flow up the flutes within the drill stop and, FIG. 7 is a vertical sectional view, taken substantially on the line 7 — 7 FIG. 6 showing constricted cylindrical wall end portions of the drill stop for preventing chip flow up the inner wall thereof within the flutes.

Referring to the drawing, the numeral 10 throughout the figures is utilized to denote a conventional twist drill. Turning now to FIG. 1 it will be noted that twist drill 10 is provided with two helical flutes 12 and 14 separated by a web 18 (see also e.g. FIG. 4) and includes a conventional elongated cylindrically shaped drill body portion 20 sometimes termed shank terminating the end of drill 10 opposite the other end of drill 10 which terminates in drill point 22. Surrounding twist drill 10 and providing a clearance fit therewith is a drill stop indicated generally at 30 which comprises a cylindrically shaped tubular member 32 of steel provided with a dimple 34. Dimple 34 may be installed in cylindrically shaped tubular member 32 by a pip forming punch (not shown) which in effect provides a dent in the wall of tubular member 32 and a protuberance of a wall portion into the cylinder cavity. Dimple 34 is dimensional to extend into a helical flute (12 or 14) and track therewithin (the flute acting as a guide) from the drill point 22 along the flute (with clearance fit) while tubular member 32 rotates about drill 10 until an interference fit is provided along flute run out ramp portion 36 of the flute. Flute run out ramp portion 36 occurs along that portion of twist drill 10 where the depth of a flute is decreasing (from full depth along drill end portion to no depth at all at shank portion 20).

Hereinbefore referenced cylindrically shaped tubular member 32 may comprise a steel e.g. 304 stainless, ⅛ hardness. Dimple 34 is located off center with respect to the longitudinal length L of cylindrically shaped tubular member 32, preferably about ¼ inch off center since this provides reversibility in the use of drill stop 30 by the operator. With a ¼ inch off center dimple 34, than ½ inch of the drill extends out of drill stop 30 in the beginning of use thereof so that when the drill length is shortened by about ¼ inch from ½ inch exposure drill stop 30 can be reversed telescopically on the drill to provide continued further length of drill exposure (an additional ½ inch protruding of the drill so that it can again be used down to where about ¼ inch is exposed) and continued drill stop functions.

FIG. 2 shows drill 10 prior to insertion in drill stop 30 and FIG. 3 is a view of drill stop 30 ready for use with drill point 22 extending therefrom for use, initially about ½ inch until worn down to about ¼ inch.

FIG. 4 shows actual contact and consequent interference fit of the inner surface of dimple 34 of housing 30 with the bottom of flute 14 which occurs as hereinbefore mentioned along flute run out ramp portion 36.

FIG. 5 shows a further embodiment in which further dimple 44 is arranged diametrically opposite dimple 34 in the wall of cylindrically shaped tubular member 32 to provide added interference fit forces so that both dimples aid in preventing any further motion of drill stop 30 beyond a predetermined position up shank 20. Each of dimples 34 and 44 are elastically deformed along the region 36 of interference fit after they have tracked up flutes 14 and twelve respectively upon twisting of drill 10 within cylindrically shaped tubular member 32. Release of either a single or double dimpled drill stop is done by simply applying a light tap on the drill 10.

FIGS. 6 and 7 relate to an embodiment illustrative of how an end of cylindrically shaped tubular member 32 of FIG. 1 (denoted in FIGS. 6 and 7 by the numeral 52) may be constricted on opposite sides 54 and 56 conforming substantially with flute geometry at 14 and 12 respectively to prevent chip entrance along these drill flute grooves up inside cylindrically shaped tubular member 52.

What is claimed is:

1. A double ended tubular shaped drill stop which is reversible for utilization upon decrease in length of the drill to provide continued further length of drill exposure, said double ended tubular shaped drill stop capable of telescoping over a drill having opposed helical flute surfaces which include run out ramp portions extending between the maximum depth portions of said flute surface and the other surface shank portion of the drill, said double ended tubular shaped drill stop including an inner protruding surface portion of the inner wall of said double ended tubular shaped drill stop disposed off center with respect to the longitudinal length thereof and extending from said inner wall of said double ended tubular shaped drill stop into at least one of the said helical flute surfaces and providing clearance fit therewith along said maximum depth portions and further providing an interference fit with respect to said run out ramp portions so that any further telescoping of said double ended tubular shaped drill stop beyond a predetermined position up the outer surface shank portion of the drill is prevented upon the occurrence of said interference fit.

2. The invention according to claim 1 wherein said double ended tubular shaped drill stop includes constructed diameter opposing opposite wall surface portions at one end thereof extending respectively with clearance fit into a first and second of said helical flute surfaces.

3. In a drill stop comprising a tubular member, the improvement comprising:
   means for locking said drill stop to prevent further travel of said drill stop in the direction of the shank end portion of a drill, said means including at least a first protuberance comprising an inwardly extending first dent in a wall surface portion of said tubular member, said first dent in said wall surface portion of said tubular member disposed off center with respect to the longitudinal length of said tubular member, said means for locking said drill stop to prevent further travel of said drill stop in the direction of the shank end portion of said drill including a second dent in a further wall surface portion of said cylindrically shaped tubular member disposed diametrically opposite said first dent, said means for locking said drill stop providing automatic lock on upon bottoming out of said first and second dents on the flute run out ramp of the drill.

4. The invention according to claim 3 wherein said inwardly extending first dent in said wall surface portion is disposed about ¼ inch off center longitudinally along the longitudinal length of said cylindrically shaped tubular member.

* * * * *